United States Patent
Yuan et al.

(10) Patent No.: US 9,037,272 B2
(45) Date of Patent: May 19, 2015

(54) AUTO-TUNING ELECTRO-HYDRAULIC VALVE

(71) Applicant: Eaton Corporation, Cleveland, OH (US)

(72) Inventors: QingHui Yuan, Osseo, MN (US); Christy Schottler, Brooklyn Park, MN (US); Wade Gehlhoff, Shakopee, MN (US); Hong Singhania, Prior Lake, MN (US)

(73) Assignee: Eaton Corporation, Cleveland, OH (US)

( * ) Notice: Subject to any disclaimer, the term of this patent is extended or adjusted under 35 U.S.C. 154(b) by 166 days.

(21) Appl. No.: 13/939,963

(22) Filed: Jul. 11, 2013

(65) Prior Publication Data

US 2013/0297045 A1    Nov. 7, 2013

Related U.S. Application Data

(62) Division of application No. 13/567,715, filed on Aug. 6, 2012, now Pat. No. 8,527,073, which is a division of application No. 12/483,091, filed on Jun. 11, 2009, now Pat. No. 8,239,069.

(60) Provisional application No. 61/060,601, filed on Jun. 11, 2008, provisional application No. 61/087,608, filed on Aug. 8, 2008.

(51) Int. Cl.
*G05B 13/02* (2006.01)
*F15B 13/043* (2006.01)
(Continued)

(52) U.S. Cl.
CPC .......... *G05B 13/021* (2013.01); *F15B 13/0433* (2013.01); *F15B 13/16* (2013.01); *G05D 7/0652* (2013.01)

(58) Field of Classification Search
CPC .. G05B 13/042; G05B 13/024; G05B 13/048; G05B 13/02; G05B 5/01; G05B 11/42; F23N 2023/40; F23N 2023/44
USPC ........................................ 700/28, 32, 36–37
See application file for complete search history.

(56) References Cited

U.S. PATENT DOCUMENTS 4,336,745 A * 6/1982 Lund ................................ 91/35
4,615,358 A * 10/1986 Hammond et al. ...... 137/625.63
(Continued)

FOREIGN PATENT DOCUMENTS

EP         1 295 778 A1    3/2003
JP         56-39311        4/1981
(Continued)

OTHER PUBLICATIONS

A.V. Wouwer, C. Renotte, and M. Remy, "Application of stochastic approximation techniques in neural modeling and control," *International Journal of System Science*, vol. 34, No. 14-15, pp, 851-863, Nov.-Dec. 2003.

(Continued)

*Primary Examiner* — Ronald Hartman, Jr.
(74) *Attorney, Agent, or Firm* — Merchant & Gould P.C.

(57) ABSTRACT

A flow control valve includes a housing that includes a fluid inlet, a fluid outlet, a first work port and a second work port. The housing defines a spool bore and a pilot spool bore. A main stage spool is disposed in the spool bore. A pilot stage spool is disposed in the pilot spool bore. The pilot stage spool is in selective fluid communication with the main stage spool. A microprocessor includes a controller having a restricted structured controller and a compensation controller. Outputs of the restricted structured controller and the compensation controller are summed to form an electrical signal that is communicated to the pilot stage spool.

7 Claims, 14 Drawing Sheets

(51) Int. Cl.
*G05D 7/06* (2006.01)
*F15B 13/16* (2006.01)

(56) References Cited

U.S. PATENT DOCUMENTS

| | | | |
|---|---|---|---|
| 5,303,636 A * | 4/1994 | Stephenson et al. | 91/471 |
| 5,385,171 A * | 1/1995 | Cleasby | 137/625.64 |
| 5,420,785 A * | 5/1995 | Shinskey | 700/37 |
| 5,719,791 A * | 2/1998 | Neumeier et al. | 700/274 |
| 5,726,877 A * | 3/1998 | Antoszkiewicz et al. | 700/41 |
| 5,915,667 A * | 6/1999 | Kim et al. | 251/129.08 |
| 6,269,733 B1 | 8/2001 | Reust | |
| 6,330,483 B1 | 12/2001 | Dailey | |
| 6,474,304 B1 | 11/2002 | Lei | |
| 6,615,114 B1 | 9/2003 | Skiba et al. | |
| 6,622,675 B1 | 9/2003 | Simpson | |
| 6,697,682 B2 | 2/2004 | Dozono et al. | |
| 7,130,721 B2 | 10/2006 | Wear et al. | |
| 7,689,309 B2 | 3/2010 | Zheng | |
| 7,930,045 B2 * | 4/2011 | Cheng | 700/45 |
| 7,966,080 B2 * | 6/2011 | Jia et al. | 700/29 |
| 8,036,762 B1 | 10/2011 | Young et al. | |
| 8,118,276 B2 | 2/2012 | Sanders et al. | |
| 2002/0128732 A1 | 9/2002 | Dozono et al. | |
| 2003/0196618 A1 | 10/2003 | Simpson | |
| 2007/0012290 A1 | 1/2007 | Yamaguchi et al. | |
| 2007/0067057 A1 | 3/2007 | De Vos et al. | |
| 2007/0268068 A1 | 11/2007 | Yutkowitz | |
| 2008/0082242 A1 | 4/2008 | Dell'Eva et al. | |
| 2008/0237517 A1 | 10/2008 | Krupadanam | |
| 2008/0257422 A1 | 10/2008 | Fack et al. | |
| 2009/0012772 A1 | 1/2009 | Zheng | |
| 2010/0198368 A1 * | 8/2010 | Mestha et al. | 700/28 |
| 2010/0292851 A1 | 11/2010 | Reiter et al. | |
| 2012/0053705 A1 | 3/2012 | Bensoussan | |
| 2013/0261787 A1 * | 10/2013 | Wang et al. | 700/213 |

FOREIGN PATENT DOCUMENTS

| | | |
|---|---|---|
| JP | 63-286614 | 11/1988 |
| JP | 64-15508 | 1/1989 |
| JP | 9-15868 | 1/1997 |
| JP | 2001-90774 | 4/2001 |
| WO | 2008/027169 | 3/2008 |

OTHER PUBLICATIONS

C. C. Hang, K.I. Astrom, and W.K. Ho, "Refinements of ziegler-nichols tuning formula", *IEE, Part D*, vol. 138, No. 2, 1991.
D.C. Chin, "Comparative study of stochastic algorithm for system optimization based on gradient approximation," *IEEE Transactions on Systems, Man, and Cybernetics—Part B: Cybernetics*, vol. 27, No. 2, Apr. 1997.
Don DeRose, Proportional and Servo Valve Technology, Fluid Power Journal, Mar./Apr. 2003, pp. 8-12 and 15.
Eaton Corporation, Eaton Ultronics Management System (Electro-hydraulic CAN Bus Control System; TS16), May 2005, pp. 1-10.
Eaton-Corp., "Ultronics management system," 2005.
Grimble, M. J. et al., "Restricted Structure Adaptive Predictive Control of Nonlinear Systems," *IEEE International Symposium on Computer Aided Control System Design Proceedings*, Glasgow, Scotland, U.K., pp. 663-668 (Sep. 18-20, 2002).
International Search Report and Written Opinion mailed Mar. 30, 2012.
Invitation to Pay Additional Fees with Partial International Search mailed Dec. 22, 2011.
J.C. Jones et al., Developments in Design of Electrohydraulic Control Valves From Their Initial Design Concept to Present Day Design and Applications, Nov. 1997, pp. 1-19.
J.C. Spall, "Multivariate stochastic approximation using a simultaneous perturbation gradient approximation," *IEEE Transactions on Automatic Control*, vol. 37, No. 3, pp. 332-340, Mar. 1992.
J.L. Maryak and D.C. Chin, "Global random optimization by simultaneous perturbation stochastic approximation," *Johs Hopkins APL Technical Digest*, vol. 25, No, 2, pp. 91-99, 2004.
M. Jelali and A. Kroll, *Hydraulic Servo-systems: Modeling, Identification and Control*, Springer, 2003.
M.A. Johnson and M.H. moradi, *PID Control: New Identification and Design Methods*, Springer, 2005.
Q. Yuan and J.Y. Lew, "Modeling and control of a two-stage twin-spool valve for energy-saving," in the *2005 American Control Conference (ACC)*, vol. 6, Portland, OR, Jun. 2005, pp. 4364-4368.
Q. Yuan, S. Bengea, D. Piyabongkam, and P. Brenner, "Dynamic control of a distributed embedded electro-hydraulic system," *SAE 2007 Transactions Journal of Engines*, vol. V116•3, No. 2007-01-1626, May 2008.
Richard Poley, DSP Control of Electro-Hydraulic Servo Actuators Application Report, Jan. 2005, pp. 1-26.
T. Hagglund and K.J. Astrom, "Industrial adaptive controllers based on frequency response techniques," *Automatica*, vol. 27, No. 1, 1991.
W, S, Levine, *The Control Handbook*, Prentice Hall, 1996.

\* cited by examiner

AUTO-TUNING ELECTRO-HYDRAULIC VALVE

CROSS REFERENCE TO RELATED APPLICATIONS

This application is a divisional of application Ser. No. 13/567,715, filed Aug. 6, 2012, which is a divisional of application Ser. No. 12/483,091, filed Jun. 11, 2009, now U.S. Pat. No. 8,239,069, which application claims the benefit of provisional application Ser. No. 61/060,601, filed Jun. 11, 2008 and provisional application Ser. No. 61/087,608, filed Aug. 8, 2008, which applications are incorporated herein by reference in their entirety.

BACKGROUND

Electro-hydraulic valves are used in many industrial and mobile applications. If an electro-hydraulic valve needs to be serviced or replaced, the serviced or replacement electro-hydraulic valve will need to be tuned for use with the system. Such tuning is typically done manually. However, the manual tuning of electro-hydraulic valves leads to long machine downtimes for the end user.

SUMMARY

An aspect of the present disclosure relates to controller for a two-stage flow control valve. The controller includes a restricted structured controller and a compensation controller. Outputs of the restricted structured controller and the compensation controller are summed to form an electrical signal that is communicated to a pilot stage spool.

Another aspect of the present disclosure relates to a flow control valve having a housing that includes a fluid inlet, a fluid outlet, a first work port and a second work port. The housing defines a spool bore and a pilot spool bore. A main stage spool is disposed in the spool bore. A pilot stage spool is disposed in the pilot spool bore. The pilot stage spool is in selective fluid communication with the main stage spool. A microprocessor includes a controller having a restricted structured controller and a compensation controller. Outputs of the restricted structured controller and the compensation controller are summed to form an electrical signal that is communicated to the pilot stage spool.

Another aspect of the present disclosure relates to a method for optimizing a plurality of gains of a controller. The method includes defining a first gain of a control parameter. A second gain of the control parameter is defined. The first and second gains and the control parameter are used by the controller to generate a command signal for a device. A low point and a high point are selected for the first gain. A low point and a high point are selected for the second gain. Each of the low and high points of the first gain are combined with each of the low and high points of the second gain. For each combination, an error is calculated between an actual system parameter of the device and a desired system parameter. The actual system parameter is a function of the command signal. The combination that yields the lowest error is selected. The values of the first and second gains of the selected combination are used in a subsequent iteration.

Another aspect of the present disclosure relates to a method for optimizing a control parameter of a restricted structured controller. The method includes evaluating a cost function at a first time interval of a first iteration. A control parameter is calculated. The cost function is evaluated at a second time interval of the first iteration. The control parameter is updated. The cost function is evaluated at a third time interval of the first iteration. An iteration analysis is performed. The iteration analysis compares the first iteration to a previous iteration and sets the value of the control parameter to one of the value of the control parameter calculated in the first iteration and the value of the control parameter calculated in the previous iteration.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

Figure 2:
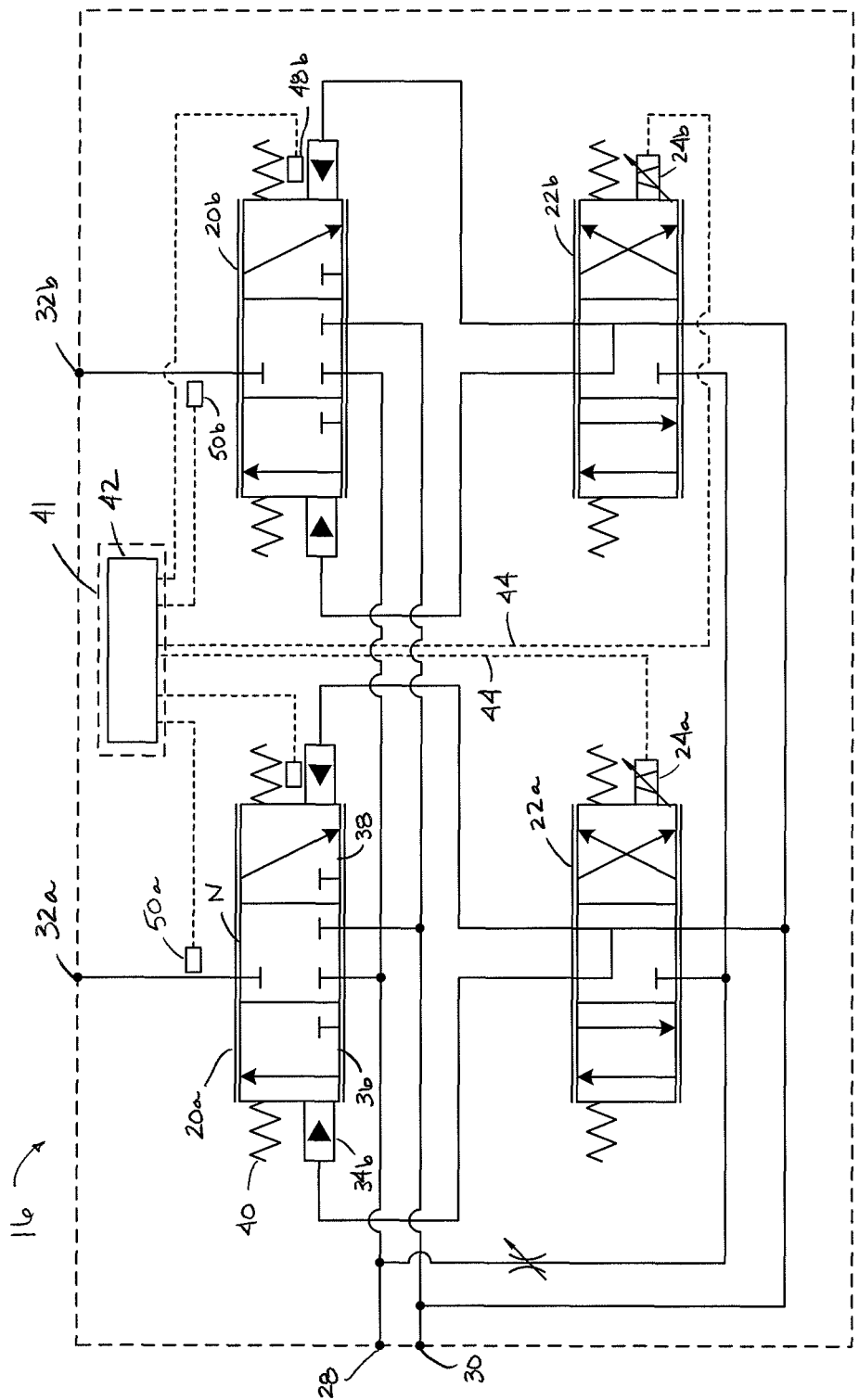
FIG. 2 is a schematic representation of a flow control valve assembly suitable for use in the hydraulic system of FIG. 1.
Figure 3:
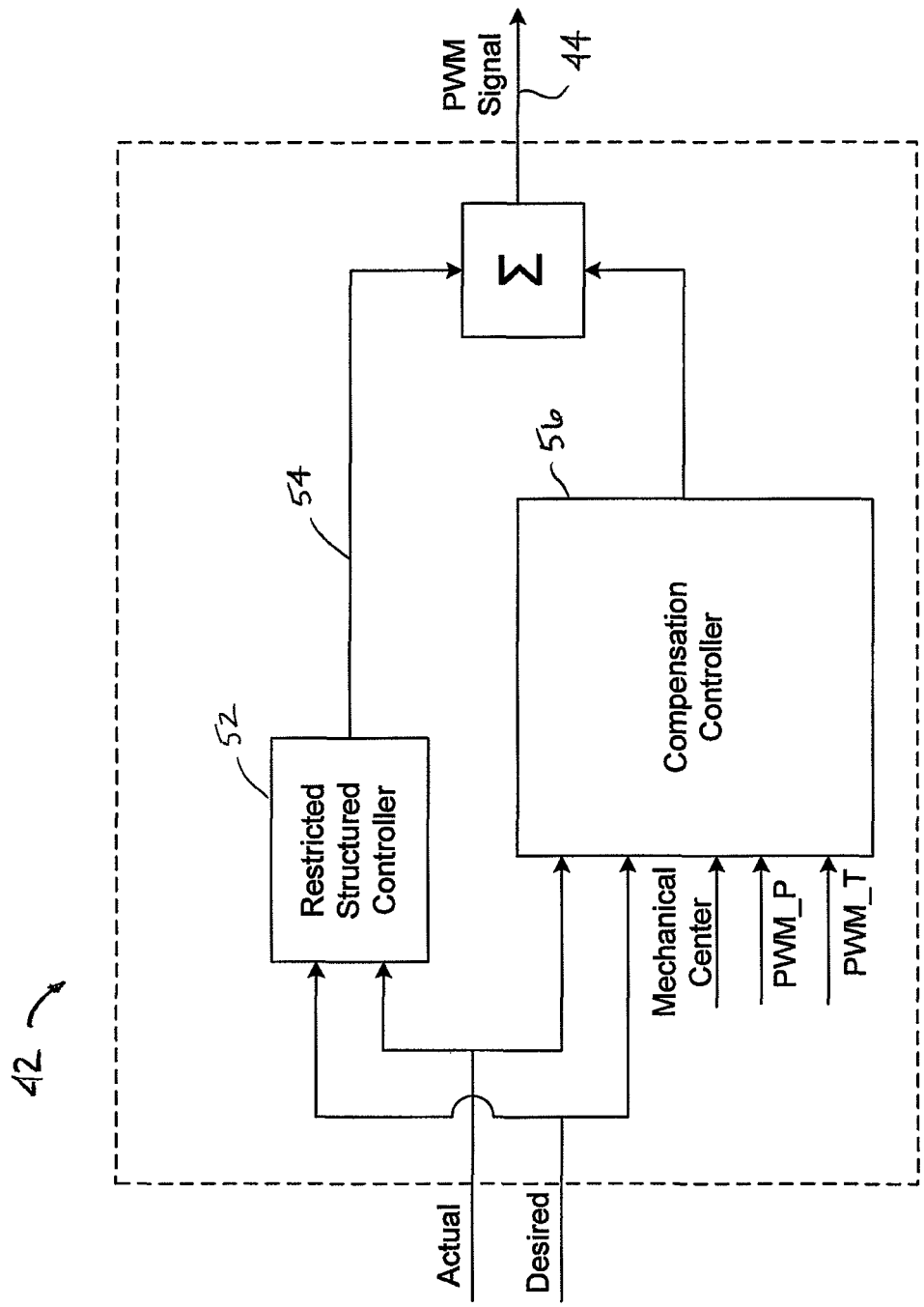

FIG. 3. is a schematic representation of a controller suitable for use in the flow control valve assembly of FIG. 2.

Figure 4:
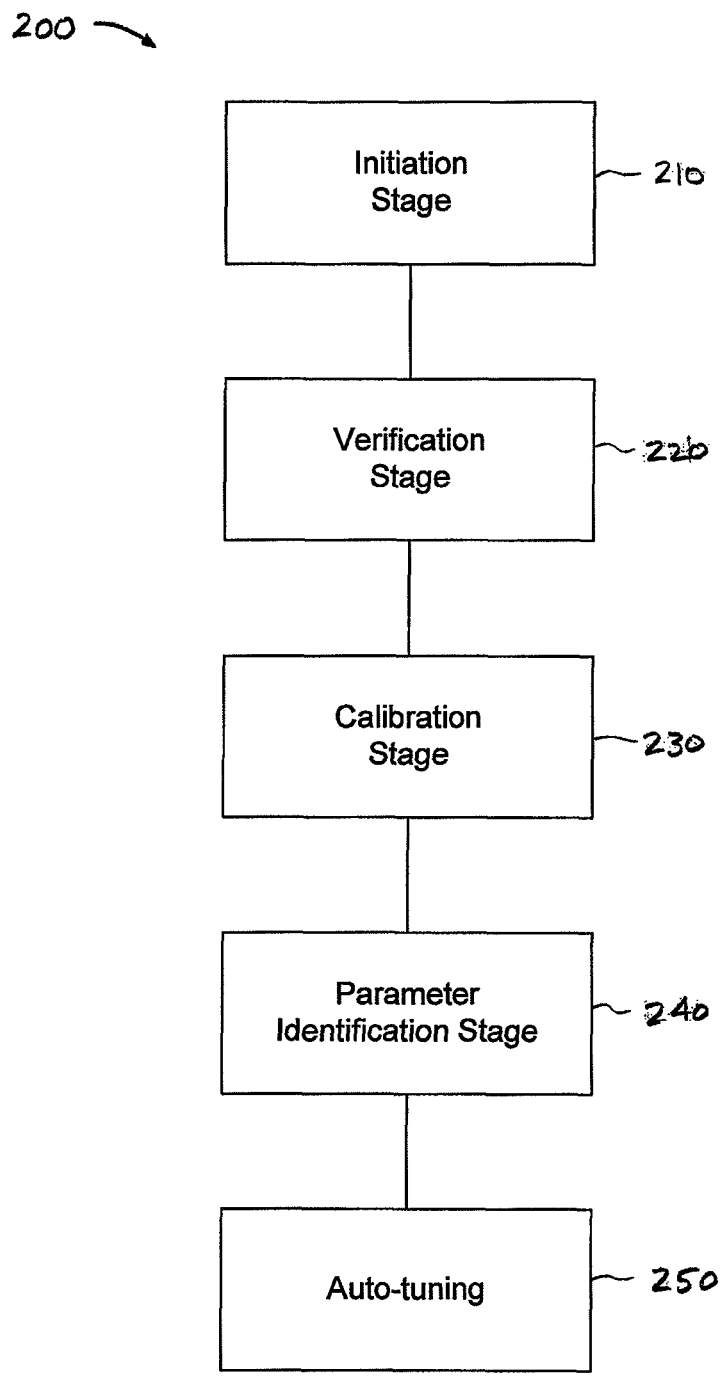

FIG. 4 is a method for auto-tuning the flow control valve assembly of FIG. 2.

Figure 5:
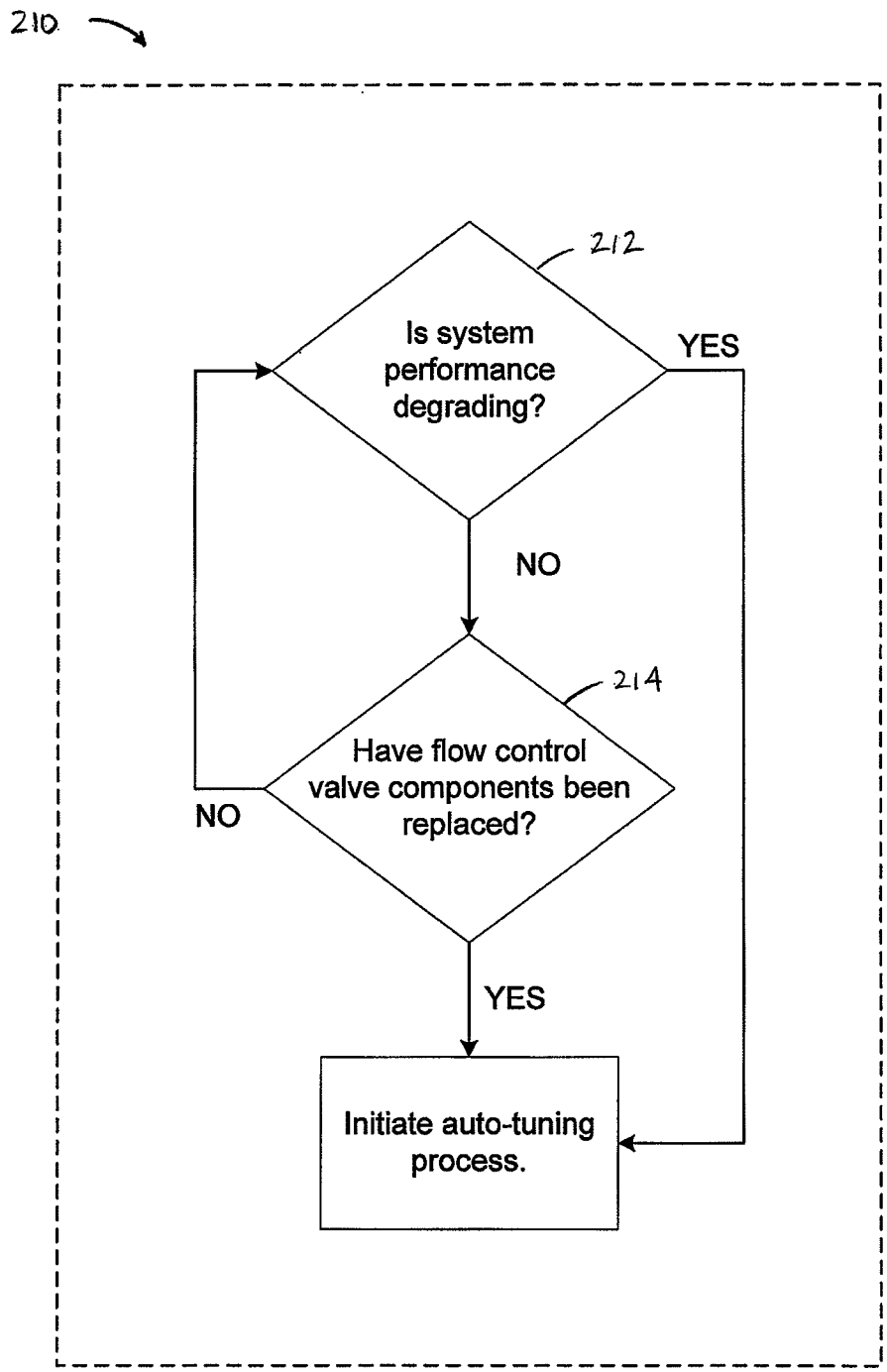

FIG. 5 is a process for initiation the auto-tuning process of FIG. 4.

Figure 6:
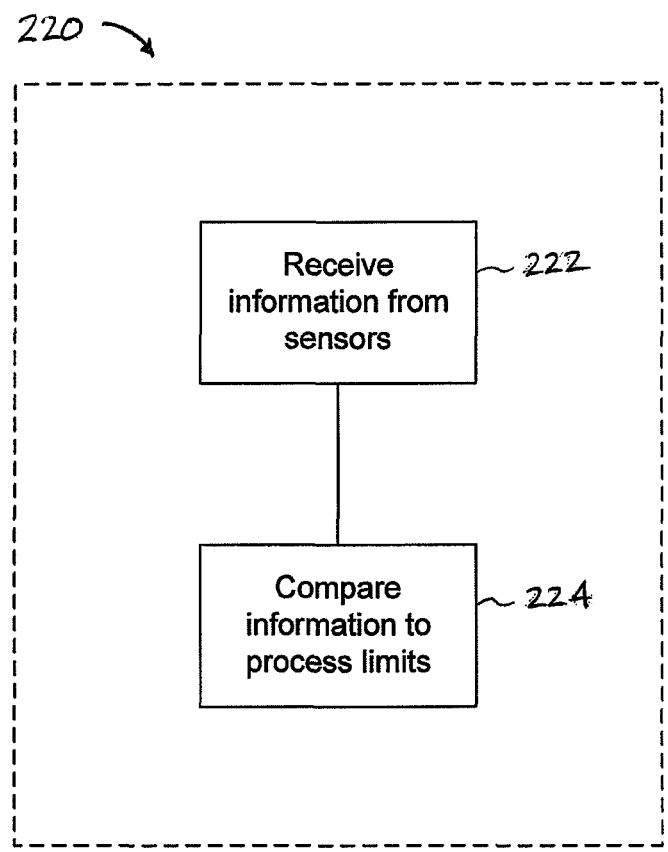

FIG. 6 is a process for verifying the initiation of the auto-tuning process of FIG. 4.

Figure 7:
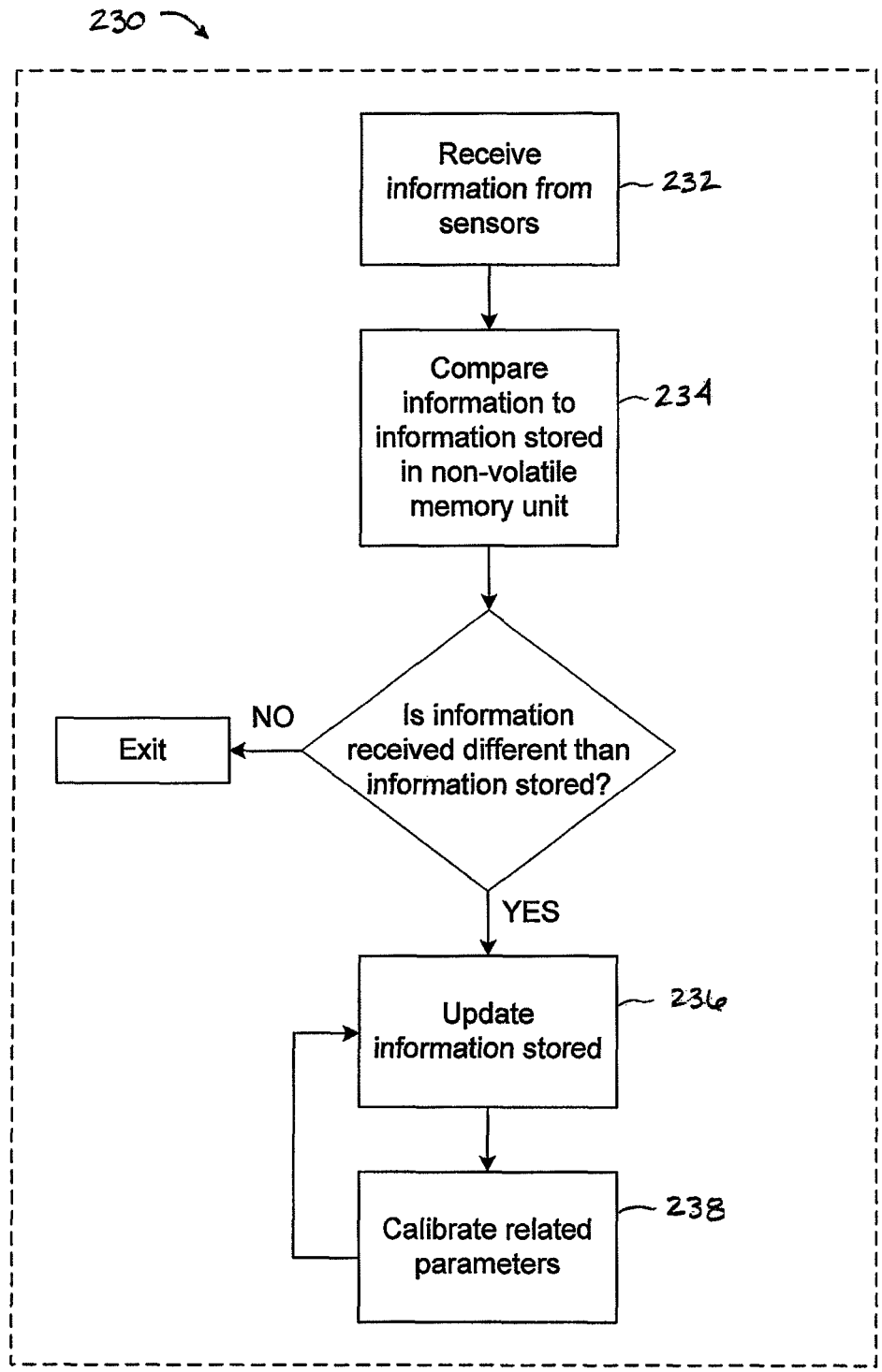

FIG. 7 is a process for calibrating system parameters of the flow control valve assembly of FIG. 2.

Figure 8:
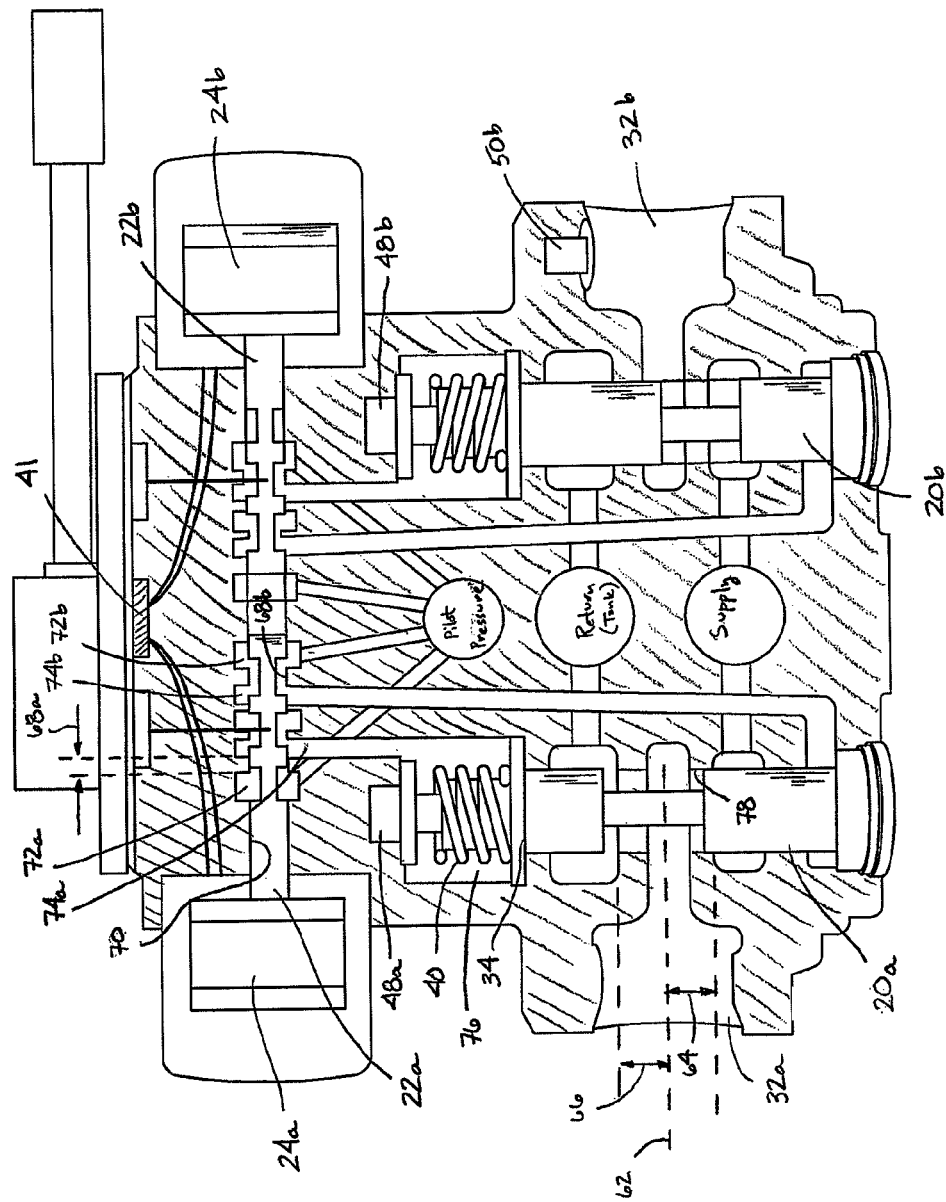

FIG. 8 is a cross-sectional view of the flow control valve assembly of FIG. 2.

Figure 9:
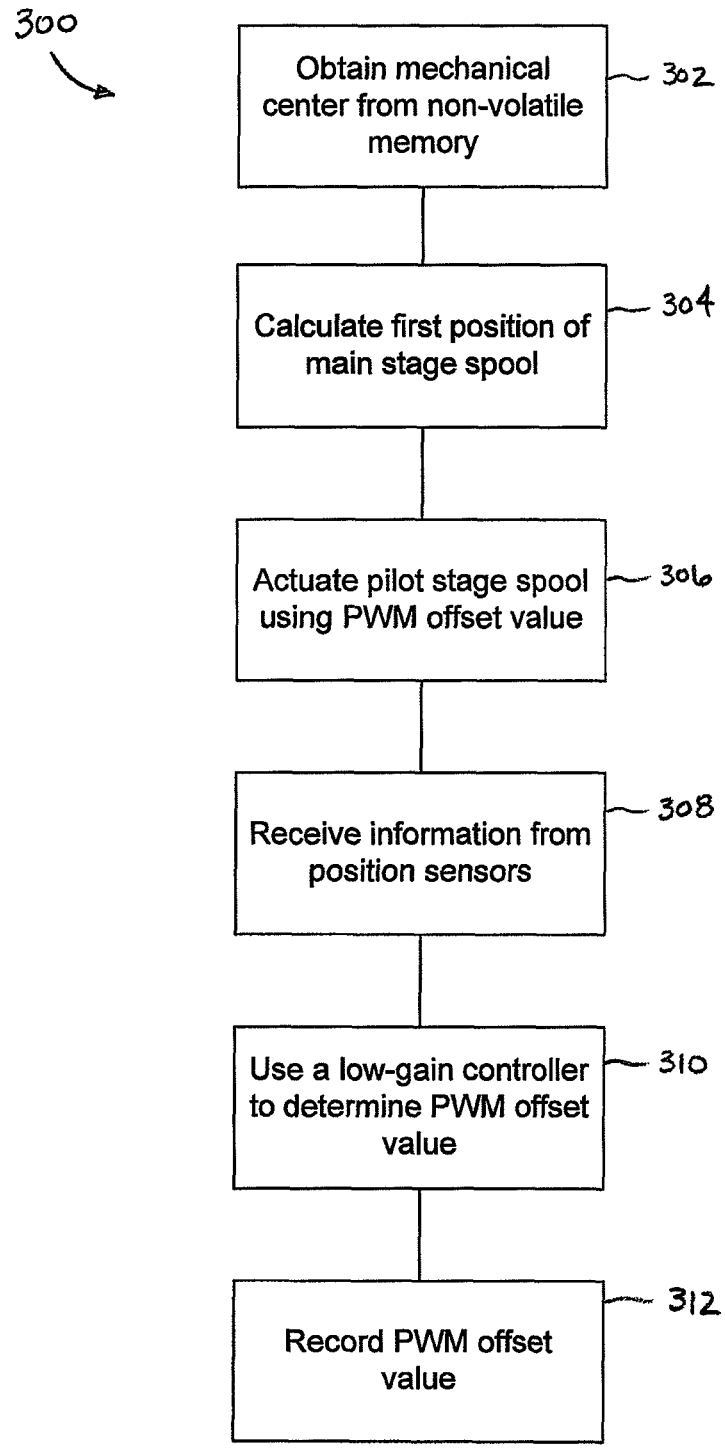

FIG. 9 is a process for identifying parameters.

Figure 10:
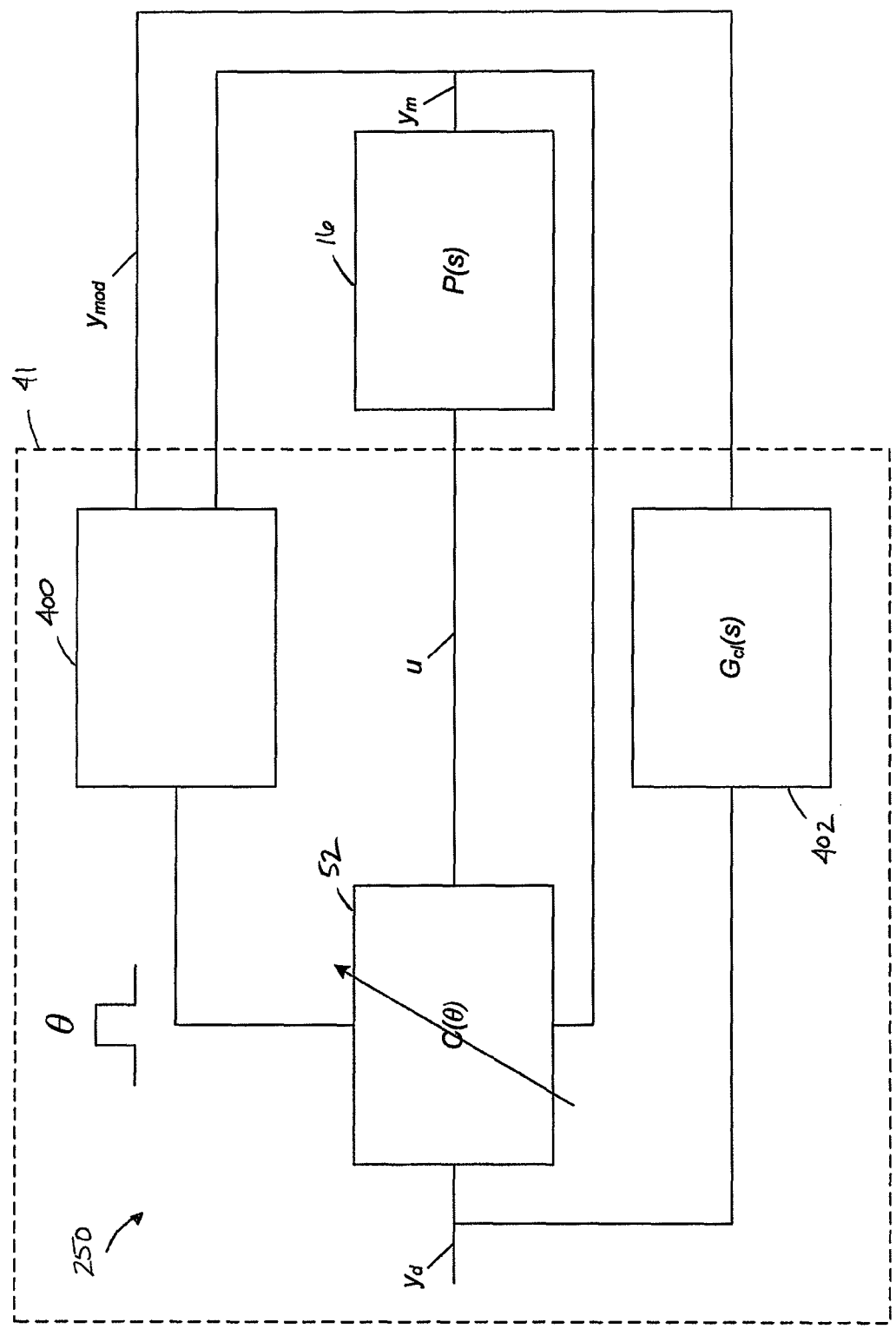

FIG. 10 is a schematic representation of an auto-tuning stage of the auto-tuning process.

Figure 11:
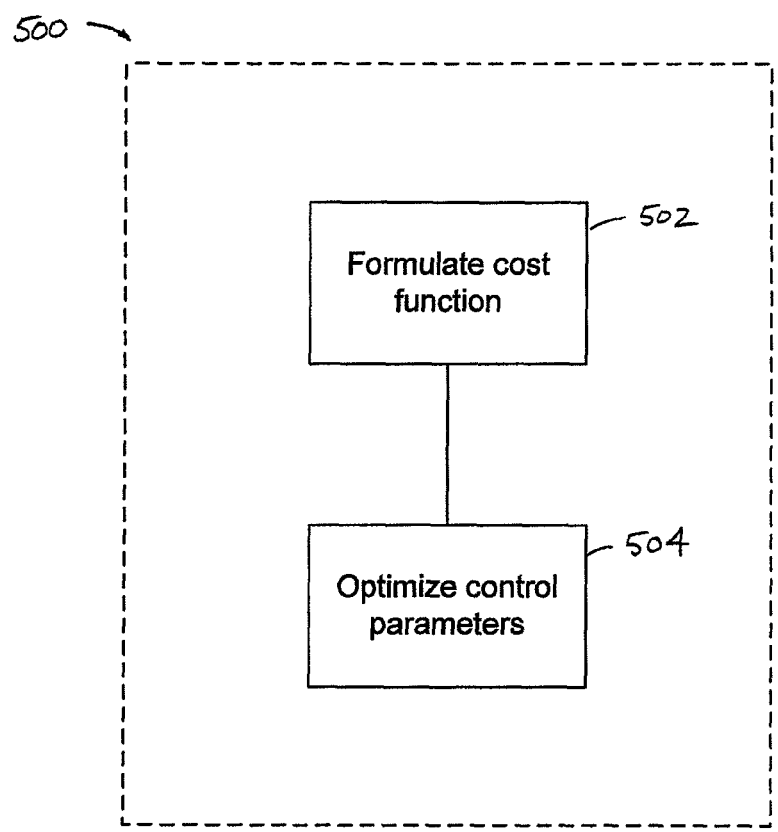

FIG. 11 is a process of auto-tuning the control parameters of the controller.

Figure 12:
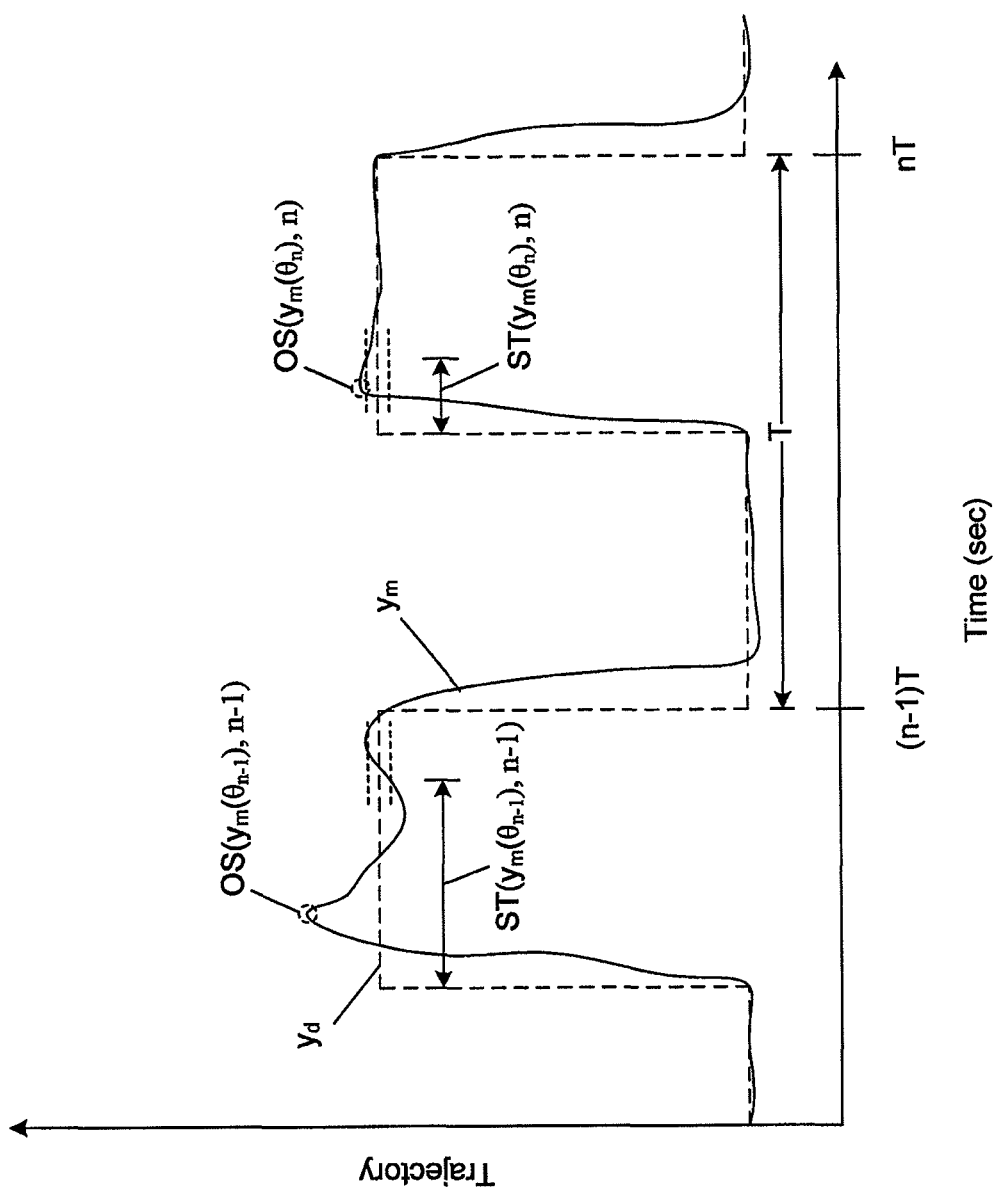

FIG. 12 is a graph of a tuning process to optimize the control parameters.

Figure 13:
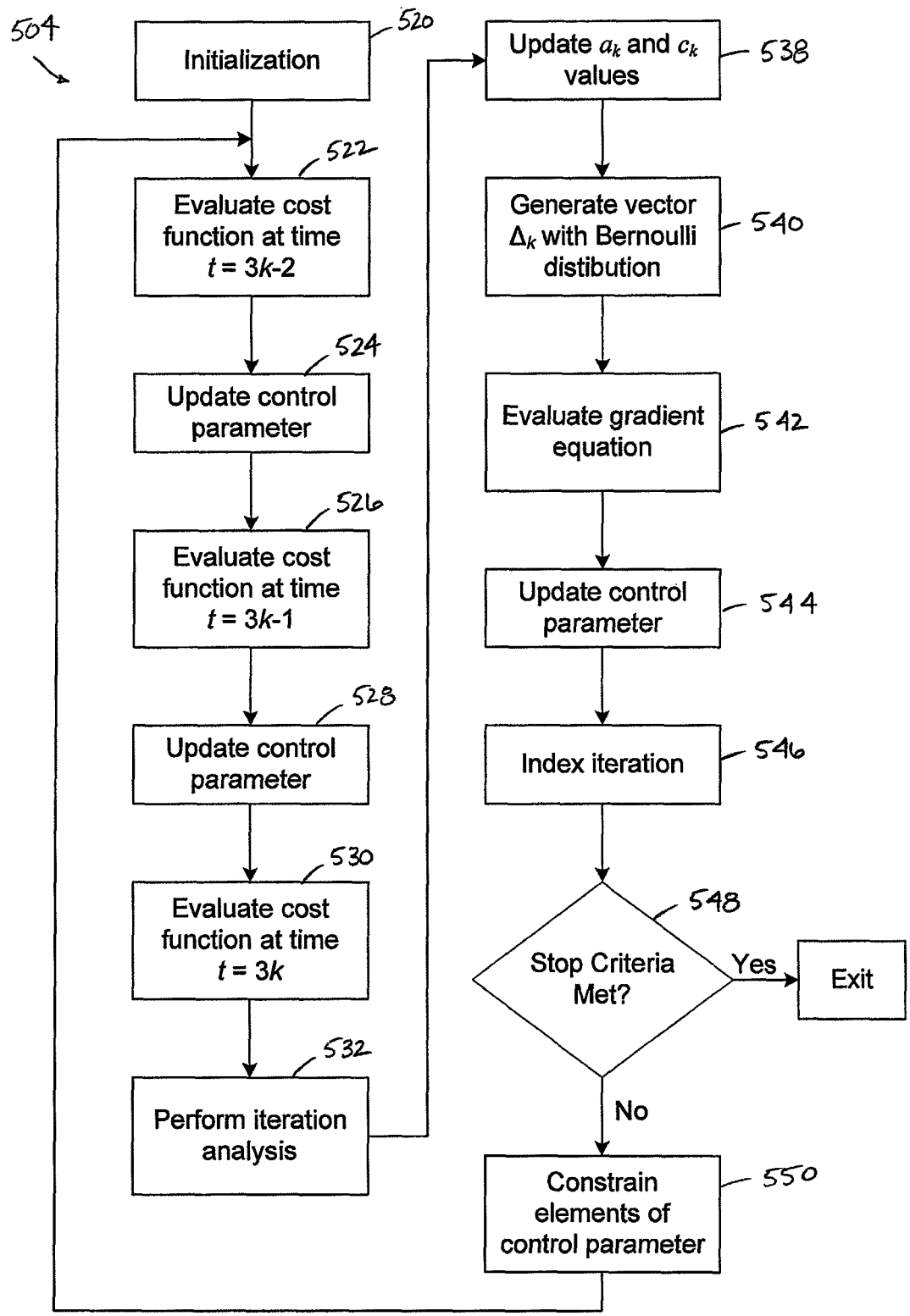

FIG. 13 is a first process for optimizing the control parameters of the controller.

Figure 14:
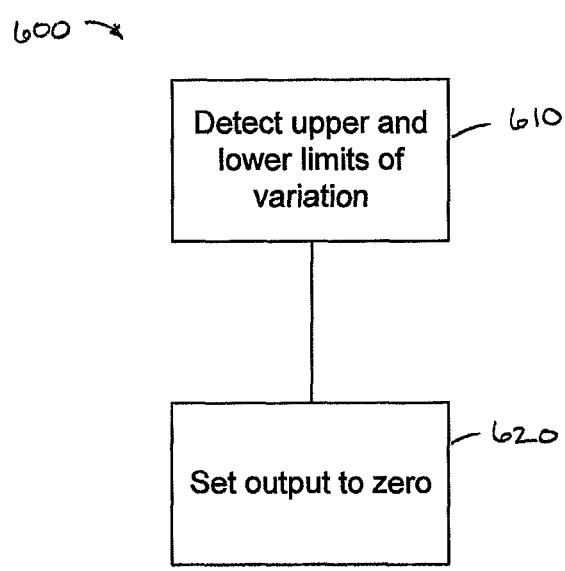

FIG. 14 is a process of attenuating vibration during the auto-tuning process.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
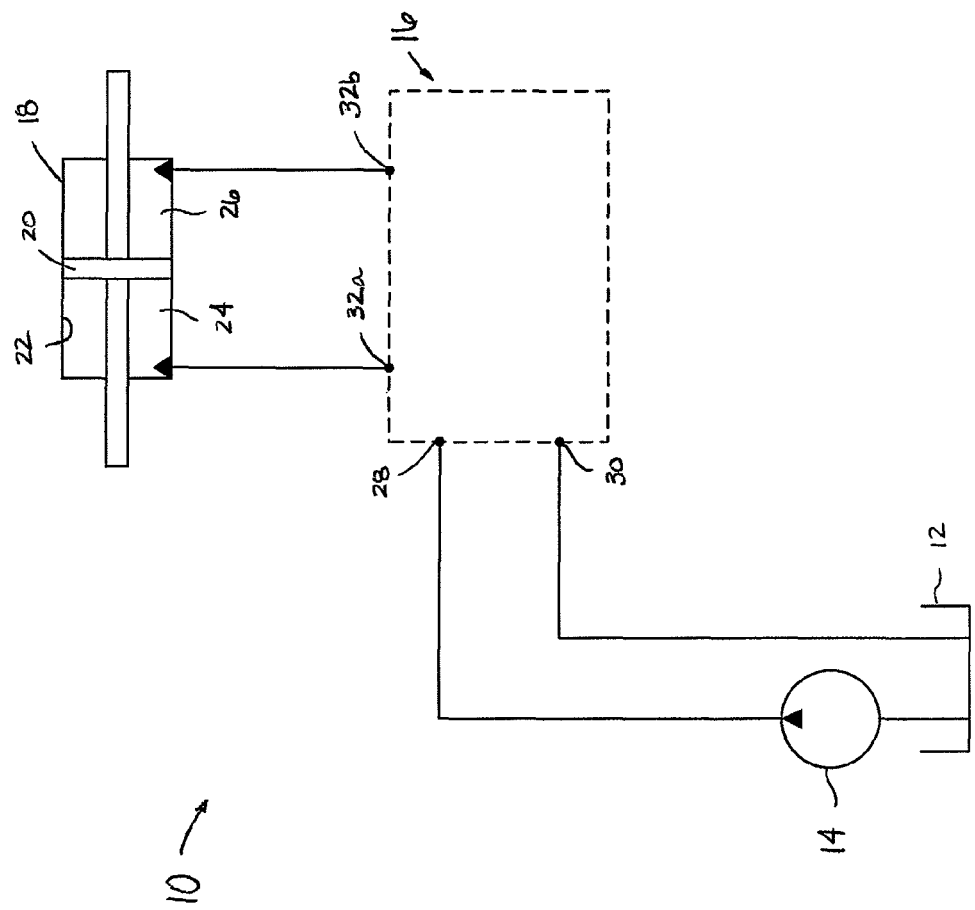
FIG. 1 is a schematic representation of a hydraulic system having features that are examples of aspects in accordance with the principles of the present disclosure.

Referring now to FIG. 1, a schematic representation of a hydraulic system, generally designated 10 is shown. In the subject embodiment, the hydraulic system 10 includes a reservoir 12, a fluid pump 14, shown herein as a fixed displacement pump, a first device, generally designated 16, and a second device, generally designated 18. In one aspect of the present disclosure, the first device 16 is a flow control valve assembly while the second device 18 is an actuator, shown herein as a linear actuator or cylinder.

In the subject embodiment, the actuator 18 includes a piston 20, which separates an internal bore 22 of the actuator 18 into a first chamber 24 and a second chamber 26. While the actuator 18 is described in the present disclosure as a linear actuator, it will be understood, that the actuator 18 of the hydraulic system 10 is not limited to being a linear actuator as the actuator 18 could alternative be a rotary actuator (e.g., a motor, etc.).

In the subject embodiment, the flow control valve assembly 16 is an electro-hydraulic control valve. The flow control valve assembly 16 includes a plurality of ports including a supply port 28 that is adapted for fluid communication with the fluid pump 14, a tank port 30 that is adapted for fluid communication with the reservoir 12, a first work port 32a and a second work port 32b. The first work port 32a is in fluid communication with the first chamber 24 of the actuator 18 while the second work port 32b is in fluid communication with the second chamber 26 of the actuator 18.

In the subject embodiment, when the flow control valve assembly 16 allows fluid communication between the supply port 28 and the first work port 32a and between the tank port 30 and the second work port 32b, pressurized fluid from the fluid pump 14 flows through the flow control valve assembly 16 into the first chamber 24 of the actuator 18 while fluid from the second chamber 26 of the actuator 18 flows to the reservoir 12. This fluid communication results in the extension of the actuator 18. In the alternative, when the flow control valve assembly 16 allows fluid communication between the tank port 30 and the first work port 32a and between the supply port 28 and the second work port 32b, pressurized fluid from the fluid pump 14 flows through the flow control valve assembly 16 into the second chamber 26 of the actuator 18 while fluid from the first chamber 24 flows to the reservoir 12. This fluid communication results in the retraction of the actuator 18.

Referring now to FIG. 2, a schematic representation of an exemplary embodiment of the flow control valve assembly 16 is shown. In the depicted embodiment of FIG. 2, the flow control valve assembly 16 is arranged as a twin spool two-stage valve. It will be understood, however, that the scope of the present disclosure is not limited to the flow control valve assembly 16 being a twin spool two-stage valve.

The flow control valve assembly 16 includes a first main stage spool 20a, which is in fluid communication with a first pilot stage spool 22a, and a second main stage spool 20b, which is in fluid communication with a second pilot stage spool 22b. The position of the first and second pilot stage spools 22a, 22b are controlled by electromagnetic actuators 24a, 24b, respectively. In the subject embodiment, the electromagnetic actuators 24a, 24b are voice coils. As the first and second main stage spools 20a, 20b are substantially similar in the subject embodiment, the first and second main stage spools 20a, 20b will be collectively referred to as main stage spools 20 in either the singular or plural form as required by context. Similarly, the first and second pilot stage spools 22a, 22b and the first and second electromagnetic actuators 24a, 24b will be collectively referred to as pilot stage spools 22 and electromagnetic actuators 24, respectively, in either the singular or plural form as required by context. It will be understood, however, that the scope of the present disclosure is not limited to the first and second main stage spools 20a, 20b, the first and second pilot stage spools 22a, 22b and the first and second electromagnetic actuators 24a, 24b being substantially similar.

The main stage spools 20 are pilot actuated. When pressurized fluid is supplied to a first end 34a of the main stage spool 20, the main stage spool 20 is actuated to a first position 36. When pressurized fluid is supplied to an opposite second end 34b of the main stage spool 20, the main stage spool 20 is actuated to a second position 38. In the first position 36, fluid is communicated from the supply port 28 to the work port 32. In the second position 38, fluid is communicated from the work port 32 to the tank port 30. In the subject embodiment, the main stage spool 20 is biased to a neutral position N by a spring 40 disposed on each of the ends 34 of the main stage spool 20.

The positions of the pilot stage spools 22 control the positions of the main stage spools 20 by regulating the fluid pressure that acts on the ends 34 of the main stage spools 20. In addition to controlling whether the work port 32 is in fluid communication with the supply port 28 or the tank port 30, the positions of the main stage spools 20 control the flow rate of fluid to the work port 32. The pilot stage spools 22 are actuated in response to electrical signals received by the electromagnetic actuators 24. In the subject embodiment, the electrical signals received by the electromagnetic actuators 24 are pulse width modulation (PWM) signals. The pulse width modulation signals are square waves whose pulse width can be modulated in order to vary the value (i.e., the PWM value) of the waveform. By varying the PWM value, the pilot stage spools 22 can be more accurately positioned and controlled.

The flow control valve assembly 16 further includes a microprocessor 41. The microprocessor 41 includes a controller 42. In the subject embodiment, the controller 42 selectively provides command signals 44 to the pilot stage spools 22. In one aspect of the present disclosure, the command signals 44 are electrical signals 44. In another aspect of the present disclosure, the electrical signals 44 are PWM signals. In response to the PWM signals 44, the pilot stage spools 22 are actuated such that pressurized fluid is communicated to one of the ends 34 of each of the main stage spools 20.

In the subject embodiment, the controller 42 provides the PWM signals 44 in response to information received from the hydraulic system 10 and/or from an operator of the hydraulic system 10. The controller 42 receives information regarding a desired system parameter that corresponds to a desired system output (e.g., position of the actuator 18, flow to the actuator 18, etc.) and information regarding an actual system parameter. The corresponding desired system output (or set point) can be inputted by an operator in a variety of ways, including but not limited to a joystick used by the operator or through a keyboard. The actual system parameter can be received from any of the sensors in the flow control valve assembly 16 or from any sensors in they hydraulic system 10. For example in one embodiment, the controller 42 receives information from first and second spool position sensors 48a, 48b regarding the positions of the first and second main stage spools 20a, 20b, respectively. In this embodiment, the first and second position sensors 48a, 48b can be, but are not limited to, Linear Variable Differential Transformers (LVDTs). In this embodiment, the controller 42 would be characterized as a spool position controller. In another embodiment, the controller 42 receives information from first and second pressure sensors 50a, 50b. In this embodiment, the pressure sensors 50a, 50b are disposed in the work ports 32. In this embodiment, the controller 42 would be characterized as a pressure controller. In another embodiment, the controller 42 could be a spool position and pressure controller.

Referring now to FIG. 3, a schematic representation of the controller 42 is shown. The controller 42 includes a restricted structured controller (e.g., PI controller, PID controller, etc.) 52. The restricted structured controller 52 receives the desired system parameter and the actual system parameter and outputs an electrical signal 54. While the electrical signal 54 from the restricted structured controller 52 can be used by itself as the PWM signal, such an electrical signal 54 would not account for the nonlinearities inherent in flow control valve assembly 16. As a result, such an electrical signal 54, if used solely as the PWM signal, would be inaccurate or inefficient. Therefore, the controller 42 also includes a compensation controller 56 to compensate for these system nonlinearities. The outputs from the restricted structured controller 52 and the compensation controller 56 are summed to form the PWM signal 44 used to control the pilot stage spool 22.

The controller 42 is adapted to generate the PWM signal 44 such that the PWM signal 44 corresponds to a desired performance characteristic of the flow control valve assembly 16. For example, if an operator or manufacturer believes that responsiveness of the flow control valve assembly 16 is more important than accuracy, control parameters of the controller 42 can be optimized to achieve that result. If, however, accuracy is more important, than the control parameters of the controller 42 can be optimized to minimize the error between the actual system parameter (e.g., actual main stage spool position, etc.) as measured by the sensors and the desired system parameter (e.g., desired main stage spool position, etc.).

The control parameters are affected by a number of factors, including but not limited to manufacturing tolerances of the flow control valve assembly 16, assembly of the flow control valve assembly 16, and loading conditions on the flow control valve assembly 16. As a result, the control parameters need to be tuned or adjusted to optimum values in order to achieve a desired control response. If the control parameters are incorrectly chosen, however, the flow control valve assembly 16 can become unstable.

While the control parameters can be adjusted or tuned manually, such an approach would likely be imprecise, non-repeatable, subjective and inefficient. As a result, a process will be described in which the flow control valve assembly 16 self-tunes the control parameters of the controller 42.

Referring now to FIG. 4, the auto-tuning process 200 for the controller 42 of the flow control valve assembly 16 is shown. In the subject embodiment, the auto-tuning process 200 is initiated by the operator of the hydraulic system 10. The operator may initiate the auto-tuning process 200 if any one of the pilot stage spools 22 of the flow control valve assembly 16 has been replaced or if the operator notices degradation in the performance of the flow control valve assembly 16.

As the flow control valve assembly 16 self-tunes or self-adjusts the control parameters of the controller 42, the flow control valve assembly 16 is field serviceable. As the flow control valve assembly 16 is field serviceable, the flow control valve assembly 16 can be installed, repaired or replaced in the field relatively quickly, which leads to decreased system downtimes for end users.

The auto-tuning process 200 includes a plurality of stages. In each stage, a set of parameters are identified and/or tuned. This set of parameters is then used in subsequent stages. This multi-stage approach is potentially advantageous as it allows problems to be localized to a given stage.

Referring now to FIGS. 4 and 5, the first stage 210 of the auto-tuning process 200 is the initiation stage. In the subject embodiment, the operator of the hydraulic system 10 initiates the auto-tuning process 200 based on responses to various criteria. As provided above, the operator may initiate the auto-tuning process 200 if the performance of the flow control valve assembly 16 degrades, as provided in step 212, or if components (e.g., pilot stage spool 22, etc.) have been replaced, as provided in step 214.

Referring now to FIGS. 4 and 6, after the auto-tuning process 200 has been initiated, the auto-tuning process 200 proceeds to a verification stage 220. In the verification stage 220, the hydraulic and electronic conditions of the flow control valve assembly 16 are measured to assess whether auto-tuning process 200 can proceed. For example, the microprocessor 41 receives information from the pressure sensors 50 to assess whether there is pressurized fluid at the work ports 32 or to assess whether there is pressurized fluid being supplied to the flow control valve assembly 16 from the fluid pump 14, as provided in step 222. In step 224, the microprocessor 41 compares this received information to pressure limits or ranges required for the continuation of the auto-tuning process 200. If the pressure readings from the pressure sensors 50 are within the limits, the auto-tuning process 200 can proceed.

Referring now to FIGS. 4 and 7, the third stage 230 of the auto-tuning process 200 is a system calibration stage. In the system calibration stage 230 of the auto-tuning process 200, measurements from sensors in communication with the microprocessor 41 of the flow control valve assembly 16 are used to calibrate system parameters. During the manufacturing process of the flow control valve assembly 16, initial values for these system parameters are stored in a non-volatile memory unit 60 of the flow control valve assembly 16. These initial values are obtained during assembly testing.

In the system calibration stage 230, the sensors of the flow control valve assembly 16 provide readings to the microprocessor 41 for at least some of these system parameters in step 232. Based on these readings, the microprocessor 41 calibrates the remaining system parameters. For example, measurements from the first and second position sensors 48a, 48b can be used to evaluate the mechanical center 62 of each of the main stage spools 20 of the flow control valve assembly 16. With this mechanical center 62 value, the microprocessor 41 calibrates the distances from the mechanical center 62 to a pressure edge 64 and a tank edge 66 of each of the main stage spools 20. The controller 42 uses these readings and calibrated values in order to generate the compensation signal from the compensation controller 56. Each of these values will be described in greater detail below.

Referring now to FIG. 8, a cross-section of the flow control valve assembly 16 is shown. The mechanical center 62 of the main stage spool 20 corresponds to the position of the main stage spool 20 when zero current is supplied to the pilot stage spool 22. With zero current supplied to the pilot stage spool 22, the main stage spool 20 is centered by the springs 40 disposed on the ends 34 of the main stage spool 20.

The pressure edge 64 corresponds to the axial distance from the mechanical center 62 to the axial location at which an orifice opens such that fluid is communicated from the supply port 28 to the work port 32. The tank edge 66 corresponds to the axial distance from the mechanical center 62 to the axial location at which an orifice opens such that fluid is communicated from the work port 32 to the tank port 30.

Referring now to FIGS. 7 and 8, with zero current supplied to the pilot stage spool 22, the position sensors 48 provide a first reading to the microprocessor 41 related to the position of the main stage spool 20, in step 232. In step 234, the microprocessor 41 compares this first reading to the initial value of the mechanical center 62 that is stored in the non-volatile memory unit 60. If the first reading is different than that stored in the non-volatile memory unit 60, the microprocessor 41 updates this value stored in the non-volatile memory unit 60 in step 236 and calibrates the pressure edge value 64 and the tank edge value 66 based on the relationships of the pressure edge value 64 and the tank edge value 66 to the mechanical center 62 in step 238. The microprocessor 41 then updates the system parameters stored in the non-volatile memory unit to reflect these new values.

While the mechanical center 62 can vary based on installation variations of pilot stage spool 22, the relationships between the mechanical center 62 and the pressure edge 64 and the tank edge 66 remain generally constant. As a result, in the subject embodiment, the values of the pressure edge 64 and the tank edge 66 can be calibrated from the first reading based on the relationships between the mechanical center 62 and the pressure edge 64 and the tank edge 66 as obtained from the initial values stored in the non-volatile memory unit 60.

For example, if the flow control valve assembly 16 has an initial value for the mechanical center 62 of 100, an initial value for the pressure edge of 1100 and an initial value for the tank edge of −900, the relationship between the mechanical center 62 and the pressure edge 64 and the tank edge 66 is computed by taking the difference between the pressure edge 64 and the mechanical center 62 and the tank edge 66 and the mechanical center 62. In the example, the difference between the pressure edge 64 and the mechanical center 62 is 1000 while the difference between the tank edge 66 and the mechanical center 62 is −1000. As provided above, these differences should remain generally constant.

In the above example, if the auto-tuning process 200 is initiated and the first reading of the position sensors 48 indicate that the mechanical center 62 is equal to 200, the microprocessor 41 can calibrate the pressure edge 64 and tank edge 66 based on the differences in the initial values. For example, in the above example, the microprocessor 41 can calculate the new pressure edge value by adding the new value of the mechanical center 62 (i.e., 200) to the initial difference (i.e., 1000) between the mechanical center 62 and the pressure edge 64. In this scenario, the new value for the pressure edge would be 1200 (i.e., 200+1000). Similarly, the microprocessor 41 can calculate the new tank edge value by adding the new value of the mechanical center 62 (i.e., 200) to the initial difference (i.e., −1000) between the mechanical center 62 and the tank edge 66. In this scenario, the new value for the pressure edge would be −800 (i.e., 200+(−1000)). Once these values have been calculated, these values are updated or stored in the non-volatile memory unit 60.

Referring now to FIGS. 4, 8 and 9, the next stage of the auto-tuning process 200 is a determination of critical system parameters 240. In this stage 240, critical system parameters are determined for use in the subsequent stage. In the subject embodiment, one of these critical system parameters is the PWM value required to drive the pilot stage spool 22 through a transition area 68 of a bore 70 in which the pilot stage spool 22 is disposed.

In the subject embodiment, the bore 70 includes a first transition area 68a between a first pilot pressure port 72a and a first actuation port 74a, which is in fluid communication with a first chamber 76a of a spool bore 78 in which the main stage spool 20 is disposed. The bore 70 further includes a second transition area 68b between a second pilot pressure port 72b and a second actuation port 74b, which is in fluid communication with a second chamber 76b of the spool bore 78. As the pilot stage spools 22 are not associated with position sensors, the PWM values that are required to drive the pilot stage spools 22 through the transition areas 68 are recorded in the non-volatile memory unit 60 in order to accurately position the pilot stage spools 22 in the bores 70 based on the desired system output.

In FIG. 9, a method 300 for determining first and second PWM offset values PWM_P, PWM_T, respectively, required to drive the pilot stage spool 22 through the first and second transition areas 68a, 68b is shown. One of these first and second PWM offset values PWM_P, PWM_T is used by the compensation controller 56 as a compensation signal that is summed with the electrical signal 54 from the restricted structured controller 52 to form the PWM signal 44. The first PWM offset value PWM_P is determined by obtaining the PWM value required to move pilot stage spool 22 across the first transition area 68a such that an orifice opens connecting the first pilot pressure port 72a to the first actuator port 74a.

In step 302, the compensation controller 56 obtains the mechanical center 62 from the non-volatile memory unit 60 as determined in the system calibration stage 230. In step 304, a first position of the main stage spool 20 is calculated by adding a positive value to the mechanical center 62. For example, the first position may calculated by adding a positive value of 50 um to the mechanical center 62.

In step 306, the pilot stage spool 22 is actuated using the first PWM offset value PWM_P such that pilot pressure is communicated to the first chamber 76a of the spool bore 78. In step 308, the position sensors 48 provide information regarding the position of the main stage spool 20 to the compensation controller 56. In step 310, a low-gain controller (e.g., proportional-integral (PI) controller, etc.) is used by the compensation controller 56 to determine the first PWM offset value PWM_P needed to stabilize the main stage spool 20 in the first position. In step 312, once the main stage spool 20 has been stabilized for a given period of time, the first PWM offset value PWM_P is recorded in the non-volatile memory unit 60.

After the first PWM offset value PWM_P required to drive the pilot stage spool 22 through the first transition area 68a is recorded, a second PMW offset value PWM_T required to drive the pilot stage spool 22 through the second transition area 68b is determined. The steps for this determination are similar to the steps of the method 300. However, in step 304, the position is calculated using a negative value and, in step 306, the pilot stage spool 22 is actuated such that the pilot pressure is communicated to the second chamber 76b of the spool bore 78.

Referring again to FIG. 3, the compensation controller 56 utilizes the mechanical center 62 and the position of the main stage spool 20 from the position sensor 48 to determine whether to use the first PWM offset value PWM_P or the second PWM offset value as the compensation signal. If the position of the main stage spool 20 as measured by the position sensor 48 is closer to the pressure edge 64 than the tank edge 66, the compensation controller 56 uses the first PWM offset value PWM_P. If, however, the position of the main stage spool 20 as measured by the position sensor 48 is closer to the tank edge 66 than the pressure edge 64, the compensation controller 56 uses the second PWM offset value PWM_T.

Referring now to FIGS. 4 and 10-12, a fifth stage 250 of the auto-tuning process 200 is an auto-tuning stage. In the subject embodiment, the restricted structured controller 52 is a proportional-integral (PI) controller. In another embodiment, the restricted structure controller 52 is a proportional-integral-derivative (PID) controller. In another embodiment, the restricted structured controller 52 is another type of controller.

In the PI controller, there are two control parameters θ (e.g., gains) that need to be auto-tuned or optimized. The auto-tuning stage 250 auto-tunes the control parameters θ associated with the restricted structured controller 52. A schematic representation of the auto-tuning stage 250 is shown in FIG. 10.

In the depicted embodiment of FIG. 10, the restricted structured controller 52 receives the desired system output (or set point) $y_d$ from the operator, a measured output ym from the flow control valve assembly 16 and auto-tuned control parameters θ from an automatic tuning module 400. The restricted structured controller 52 outputs a command signal u to the flow control valve assembly 16.

The automatic tuning module 400 receives the measured output $y_m$ from the flow control valve assembly 16, which is controlled by the restricted structured controller 52, and an output $y_{mod}$ from a reference model 402, which represents a desired transfer function between the desired system output $y_d$ provided by the operator and an output $y_{mod}$ of the reference model 402. The output $y_{mod}$ of the reference model 402 represents the desired response from the flow control valve assembly 16.

Based on these inputs, the automatic tuning module 400 optimizes the control parameters θ, which are provided to the restricted structured controller 52, to minimize error.

The automatic tuning module 400 uses a tuning procedure 500 for auto-tuning or optimizing the control parameters θ associated with the restricted structured controller 52. A representation of the tuning procedure 500 is shown in FIG. 11. One of the purposes of the tuning procedure 500 is to optimize the control parameters θ such that the measured output $y_m$ from the flow control valve assembly 16 approaches the output $y_{mod}$ of the reference model 402.

In one aspect of the present disclosure, the tuning procedure 500 is a time domain based procedure. In another aspect of the present disclosure, the tuning procedure 500 is a step response time domain based procedure. In yet another aspect of the present disclosure, the step response is a closed loop step response. The closed loop step response of the present disclosure uses the desired system output $y_d$ as the step trajectory (best shown in FIG. 12).

The tuning procedure 500 includes a cost function formulation process 502 and an optimization process 504. The optimization process 504 of the tuning procedure 500 can be formulated as optimization equation:

$$\theta^* = \arg \min_\theta L(\theta, n), \quad (506)$$

where θ* is the optimal control parameter that minimizes the cost function $L(\theta, n)$ for all n.

The cost function $L(\theta, n)$ is formulated to reflect performance specifications used in industry. In one aspect of the present disclosure, the cost function $L(\theta, n)$ is formulated to account for performance specifications like the integral of the absolute error, overshoot, settling time, peak error, combinations thereof, etc. In one aspect of the present disclosure, the performances accounted for by the cost function $L(\theta, n)$ are the integral of the absolute error, overshoot, settling time.

In the subject embodiment, the cost function $L(\theta, n)$ is defined by the following cost function equation:

$$L(\theta, n) = \omega_1 \int_{nT}^{(n+1)T} \| y_m(\theta) - y_{mod} \| \, dt + \omega_2 \| OS(y_m(\theta), n) - OS_d \| + \omega_3 \| ST(y_m(\theta), n) - ST_d \|,$$

(508) where $L(\theta, n)$ is the cost function for a given control parameter θ in the time span $t \in [nT, (n+1)T]$ where n=1, 2, ... and T is the period of the step profile, $y_m$ is the measured output from the flow control valve assembly 16, $y_{mod}$ is the output of the reference model 402, $OS(x,n): \{R^Z, R\} \to R$ is the mapping of the trajectory $x \in R^Z$ to the overshoot in the time span $t \in [nT, (n+1)T]$, $OS_d \in R$ is the desired overshoot, $ST(x,n): \{R^Z, R\} \to R$ is the mapping trajectory $x \in R^Z$ to the settling time in the time span $t \in [nT, (n+1)T]$, $ST_d \in R$ is the desired settling time, and $\omega_1, \omega_2, \omega_3$ are weighting functions for integral of absolute error, overshoot and settling time.

In one aspect of the present disclosure, the cost function $L(\theta, n)$ is a discrete event. The performance specifications (e.g., integral of absolute error, overshoot, settling time, etc.) are related to a full period T (shown in FIG. 12) of the step profile. In one aspect of the present disclosure, the cost function $L(\theta, n)$ is evaluated at the end of each period T in order to adequately reflect these performance specifications. As the cost function $L(\theta, n)$ is only evaluated at the end of each period T, the cost function $L(\theta, n)$ is a discrete event having a frequency of 1/T.

In another aspect of the present disclosure, the cost function $L(\theta, n)$ is distributive. One period T is required to evaluate the cost function $L(\theta, n)$. More than one period T is required to evaluate more than one cost function $L(\theta, n)$. For example, in FIG. 12, two cost functions $L(\theta_{n-1}, n-1)$ and $L(\theta, n)$ are evaluated at $(n-1)T$ and $nT$, respectively.

In one aspect of the present disclosure, the optimization of the control parameters θ is preferably based on the Simultaneous Perturbation Stochastic Approximation (SPSA). It will be understood, however, that the optimization of the control parameters could be based on standard Finite Difference Stochastic Approximation (FDSA) or the Random Direction Stochastic Approximation (RDSA).

The recursive stochastic approximation (SA) procedure is governed by the following SA equation:

$$\hat{\theta}_{k+1} = \hat{\theta}_k - a_k \hat{g}(\hat{\theta}_k), \quad (510)$$

where $\hat{\theta}_k \in R^P$ is an approximation of the solution θ* at $k^{th}$ step of recursion, $a_k$ is a sequence of positive scalars that approaches zero gradually, $\hat{g}(\cdot) \in R^P$ is an approximation of the gradient $g(\cdot)$ and k=1, 2, 3 ... counts the iterations.

The SPSA gradient approximation for $g(\hat{\theta}_k)$ is governed by the following gradient equation:

$$\hat{g}(\hat{\theta}_k) = \begin{bmatrix} \frac{L(\hat{\theta}_k + c_k \Delta_k, \cdot) - L(\hat{\theta}_k - c_k \Delta_k, \cdot)}{2 c_k \Delta_{k1}} \\ \frac{L(\hat{\theta}_k + c_k \Delta_k, \cdot) - L(\hat{\theta}_k - c_k \Delta_k, \cdot)}{2 c_k \Delta_{k2}} \\ \vdots \\ \frac{L(\hat{\theta}_k + c_k \Delta_k, \cdot) - L(\hat{\theta}_k - c_k \Delta_k, \cdot)}{2 c_k \Delta_{kp}} \end{bmatrix}, \quad (512)$$

where $c_k$ is a sequence of positive scalars, $\Delta_k \in R^P$ is a vector with Bernoulli distribution at the $k^{th}$ step of iteration, $\Delta_{ki}$ for i=1, 2, ..., p is the $i^{th}$ component of $\Delta_k$, $L(\cdot, \cdot)$ is the cost function of cost function equation 508.

Referring now to FIG. 13, the optimization process 504 of the tuning procedure 500 will be described. In step 520 of the optimization process 504, the process parameters are initialized at time t=0. In one embodiment, the following parameters are initialized at time t=0:

k=1, $\hat{\theta}_0 = 0.5(\underline{\theta} + \overline{\theta})$, $\hat{\theta}_1 = 0.5(\underline{\theta} + \overline{\theta})$, $L_0^O := L(\hat{\theta}_0, \cdot) = M_3$, $\theta_n = \hat{\theta}_1 + c_1 \Delta_1$, where $\underline{\theta}$ is the lower bound of the control parameter $\theta$, $\overline{\theta}$ is the upper bound of the control parameter $\theta$, $M_3 > 0$, and $\theta_n$ is the control parameter for the next period T.

In step 522, the cost function, $L_k^+ = L(\theta_n, 3k-2)$, is evaluated at time $t=3k-2$. In step 524, the control parameter $\theta_n$ is updated for the next cycle evaluation. The control parameter $\theta_n$ for the next cycle is equal to $\hat{\theta}_k - c_k \Delta_k$.

In step 526, the cost function, $L_k^- = L(\theta_n, 3k-1)$, is evaluated at time $t=3k-1$. In step 528, the control parameter $\theta_n$ is updated for the next cycle evaluation. The control parameter $\theta_n$ for the next cycle is equal to $\hat{\theta}_k$.

In step 530, the cost function, $L_k^O = L(\theta_n, 3k)$, is evaluated at time $t=3k$.

In step 532, an iteration analysis ($IA_1$) is performed. In one aspect of the present disclosure, the iteration analysis is a function that rejects a subsequent iteration if the subsequent iteration is overaggressive. The iteration analysis is governed by the following $IA_1$ equation:

$$\hat{\theta}_k = IA_1(\hat{\theta}_{k-1}, \hat{\theta}_k) := \begin{cases} \hat{\theta}_{k-1} \to \text{if } \|\hat{\theta}_k - \hat{\theta}_{k-1}\| > M_1 \\ \hat{\theta}_k \to \text{otherwise} \end{cases}, (534)$$

where $M_1 > 0$ is a large scalar.

In the above $IA_1$ equation 534, if the absolute value of the difference between the value of the approximated control parameter $\hat{\theta}_k$ at the current iteration k and the value of the approximated control parameter $\hat{\theta}_{k-1}$ of the previous iteration k-1 is greater than a scalar limit value $M_1$, the approximated control parameter $\hat{\theta}_k$ at the current iteration k is set to the approximated control parameter $\hat{\theta}_{k-1}$ of the previous iteration k-1. If, however, the absolute value of the difference between the value of the approximated control parameter $\hat{\theta}_k$ at the current iteration k and the value of the approximated control parameter $\hat{\theta}_{k-1}$ of the previous iteration k-1 is less than or equal to the scalar limit value $M_1$, the approximated control parameter $\hat{\theta}_k$ at the current iteration k is left unchanged.

In another aspect of the present disclosure, an alternative iteration analysis ($IA_2$) is used. The alternative iteration analysis is a function of the cost function $L(\theta, n)$. While the typical SPSA approach evaluates the cost function $L(\theta, n)$ twice (i.e., $L(\hat{\theta}_k + c_k \Delta_k, \cdot), L(\hat{\theta}_k - c_k \Delta_k, \cdot)$) for each iteration k, the optimization process 504 of the tuning procedure 500 of the present disclosure evaluates the cost function $L(\hat{\theta}_k, \cdot)$ a third time for each iteration k. In one aspect of the present disclosure, a comparison is made between the third evaluations of adjacent cost functions $L(\hat{\theta}_{k-1}, \cdot), L(\hat{\theta}_k, \cdot)$. This alternative iteration rejection is governed by the following $IA_2$ equation:

$$\hat{\theta}_k = IA_2$$
$$\left[(\hat{\theta}_{k-1}, L(\hat{\theta}_{k-1}, \cdot), L(\hat{\theta}_k, \cdot)\right] := \begin{cases} \hat{\theta}_{k-1} \to L(\hat{\theta}_k, \cdot) - L(\hat{\theta}_{k-1}, \cdot) > M_2 \\ \hat{\theta}_k \to \text{otherwise} \end{cases}, (536)$$

where $M_2 > 0$ is a large scalar.

In the above $IA_2$ equation 536, if the difference between the cost function $L(\hat{\theta}_k, \cdot)$ at the current iteration k and the cost function $L(\hat{\theta}_{k-1}, \cdot)$ of the previous iteration k-1 is greater than a scalar limit value $M_2$, the approximated control parameter $\hat{\theta}_k$ at the current iteration k is set to the approximated control parameter $\hat{\theta}_{k-1}$ of the previous iteration k-1. If, however, the difference between the cost function $L(\hat{\theta}_k, \cdot)$ at the current iteration k and the cost function $L(\hat{\theta}_{k-1}, \cdot)$ of the previous iteration k-1 is less than or equal to the scalar limit value $M_2$, the approximated control parameter $\hat{\theta}_k$ at the current iteration k is left unchanged.

In step 538, the $a_k$ and $c_k$ values associated with the SA equation 510 and the gradient equation 512 are updated. In step 540, the vector $\Delta_k$ with Bernoulli distribution is generated. In one aspect of the present disclosure, the Bernoulli distribution is normalized with respect to the range of parameters. This normalization balances the convergence in all parameter dimensions. The probability mass function for $\Delta k_{ki}$ (i.e., each element of $\Delta_k := [\Delta_{k1}, \Delta_{k2}, \ldots, \Delta_{kp}]^T$) is given by the following:

$$f\Delta_i(x) = \begin{cases} 0.5 \to x = 0.5\delta(\overline{\theta}_i - \underline{\theta}_i) \\ 0.5 \to x = -0.5\delta(\overline{\theta}_i - \underline{\theta}_i) \\ 0 \to \text{otherwise} \end{cases}$$

Where $0 < \delta < $ is a scalar determining the update ratio, and $\underline{\theta}_i$ and $\overline{\theta}_i$ are the lower bound and upper bound of each element of $\theta$. In step 542, the gradient equation 512 is rewritten as:

$$\hat{g}(\hat{\theta}_k) = \left[\frac{L_k^+ - L_k^-}{2c_k \Delta_{k1}} \quad \frac{L_k^+ - L_k^-}{2c_k \Delta_{k2}} \quad \cdots \quad \frac{L_k^+ - L_k^-}{2c_k \Delta_{kp}}\right]^T.$$

In step 544, the control parameter $\hat{\theta}_k$ is updated using SA equation 510. In step 546, the iteration k is indexed (i.e., k=k+1).

In step 548, a stop criterion is evaluated. In step 548, the stop criterion is related to the number of iterations k. If the number of iterations k exceeds a predetermined value, then the tuning procedure 500 exits.

In step 550, each element $\hat{\theta}_{ki}$ of the control parameter $\hat{\theta}_k$ is compared against constraints. If an element $\hat{\theta}_{ki}$ of the control parameter $\hat{\theta}_k$ is less than the lower bound $\underline{\theta}_i$, that element $\hat{\theta}_{ki}$ is set to the lower bound $\underline{\theta}_i$. If the element $\hat{\theta}_{ki}$ is greater than the upper bound $\overline{\theta}_i$, that element is set to the upper bound $\overline{\theta}_i$. If the element $\hat{\theta}_{ki}$ is within the constraints, the element $\hat{\theta}_{ki}$ is left unchanged. After the elements $\hat{\theta}_{ki}$ of the control parameter $\hat{\theta}_k$ have been constrained, the optimization process 504 of the tuning procedure 500 returns to step 512.

In another embodiment, an alternate optimization process is used. In this alternate embodiment, the alternate optimization process is a grid optimization process. In the grid optimization process, a range for each of the gains is defined. In one aspect of the present disclosure, there are two gains, a first gain and a second gain. In the scenario where the controller is a PI controller, the first gain is a proportional gain (PG) while the second gain is an integral gain (IG). The controller uses the control parameter and the first and second gains to generate the command signal.

The proportional gain could have a range between 0 and 0.5 while the integral gain could have a range between 0.5 and 1. A low point and a high point are selected for each gain. For example, the low and high point for the proportional gain could be 0 and 0.5, respectively, while the low and high point for the integral gain could be 0.5 and 1, respectively. One of the low and high points of the proportional gain is then combined (or multiplied) with all of the low and high points of the integral gain until all of the combinations have been exhausted. In the present example, there would be four combinations, $PG_{Low} * IG_{Low}$; $PG_{Low} * IG_{High}$; $PG_{High} * IG_{Low}$; $PG_{High} * IG_{High}$. For each combination in the subject embodiment, the error between the actual system parameter and the desired system parameter is calculated.

The combination that yields the best result is then used as a starting point for the subsequent run. If in the above example $PG_{Low}*IG_{High}$ provided the best results, each of the low point and high point for the proportional gain in the next run would be some percentage of $PG_{Low}$ while each of the low point and the high point of the integral gain would be some percentage of $IG_{High}$. For example, in the next run, the low point and high point of the proportion gain could be 0.0 and 0.25 while the low point and high point of the integral gain could be 0.75 and 1.0.

Again, one of the low and high points of the proportional gain is then combined with one of the low and high points of the integral gain and the error between the actual system parameter and the desired system parameter compared for each combination. The combination that yields the best result is then used as a starting point for the subsequent run. This process repeats until the variation of the solution is within a predefined boundary.

Referring now to FIG. 14, a vibration attenuation process 600 will be described. During the optimization process, it is possible that a set of gain values will generate an unstable dynamics response. In order to reduce the risk of damage to mechanical components resulting from instability, the vibration attenuation process can be used.

In step 610, the upper and lower limits of the PWM variation are detected. If the current varies between 5% and 95%, it is likely that there is instability. If the current varies between 5% and 95%, then the PWM output is set to zero in step 620. The main stage spool 20 gradually moves back to the mechanical center 62 due to the springs 40. The performance should be very poor when the main stage spool is at zero since the integral of absolute error will be large. Thus, this gain set will not be selected as the optimal solution for the next run.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for optimizing a control parameter of a microprocessor including a restricted structured controller, the method comprising:
    evaluating a cost function at a first time interval of a first iteration with the controller;
    calculating a control parameter with the controller;
    evaluating the cost function at a second time interval of the first iteration with the controller;
    calculating the control parameter with the controller;
    evaluating the cost function at a third time interval of the first iteration with the controller; and
    performing an iteration analysis with the controller, wherein the iteration analysis compares the first iteration to a previous iteration and sets the value of control parameter to one of the value of the control parameter calculated in the first iteration and the value of the control parameter calculated in the previous iteration.

2. The method of claim 1, wherein the iteration analysis compares the cost function at the third time interval of the first iteration to a cost function at a third time interval of the previous iteration.

3. The method of claim 1, wherein the previous iteration is immediately prior to the first iteration.

4. The method of claim 1, wherein the cost function accounts for integral of absolute error, overshoot, and settling time.

5. The method of claim 1, further comprising generating a vector with Bernoulli distribution.

6. The method of claim 5, further comprising normalizing the Bernoulli distribution.

7. The method of claim 1, further comprising comparing elements of the control parameter against upper and lower bounds.

* * * * *